Dec. 26, 1961  J. THELANDER ETAL  3,014,537
OSCILLATING PLANT THINNER
Filed June 28, 1956  3 Sheets-Sheet 1
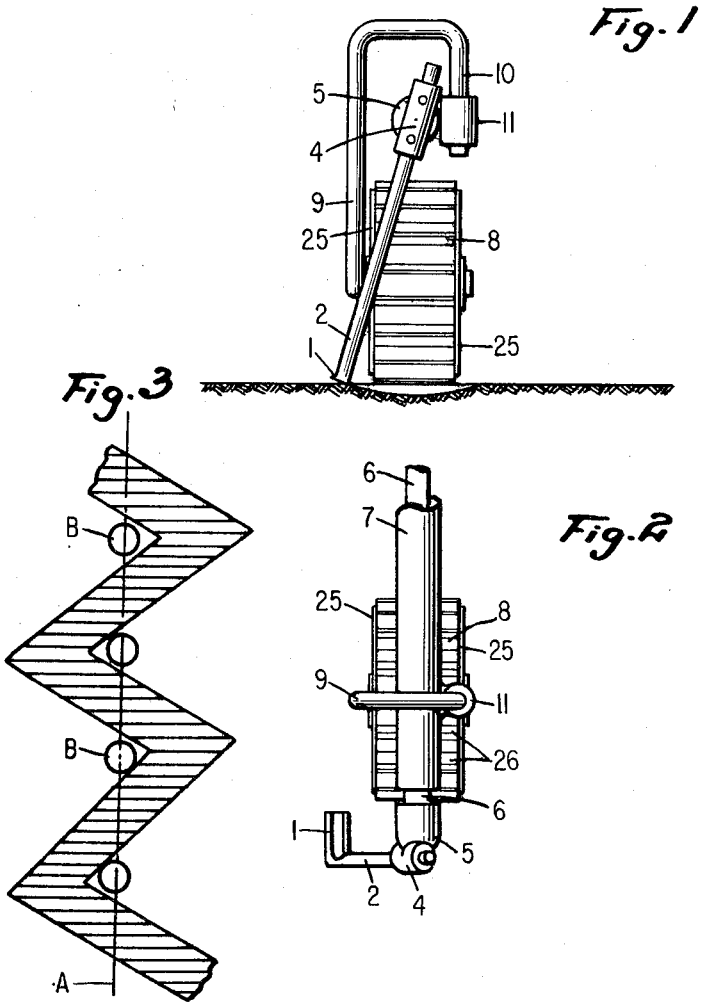
Inventors
John Thelander,
Gunnar Leijon,
Elwing Westergren,
Sven Akesson
by Sommers & Young
Attorneys

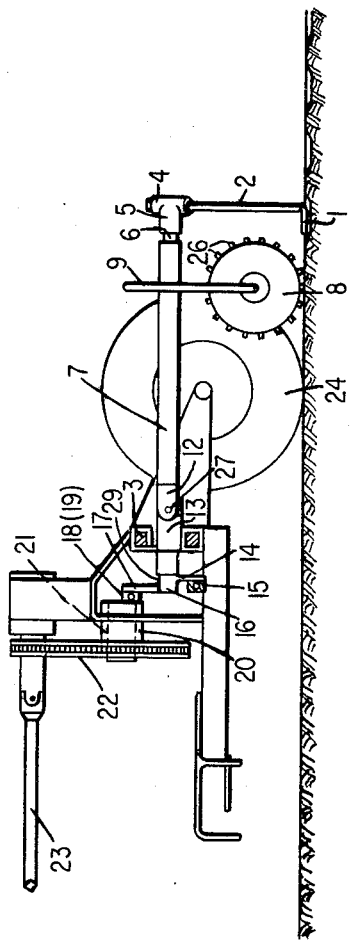

Dec. 26, 1961   J. THELANDER ETAL   3,014,537
OSCILLATING PLANT THINNER
Filed June 28, 1956   3 Sheets-Sheet 3
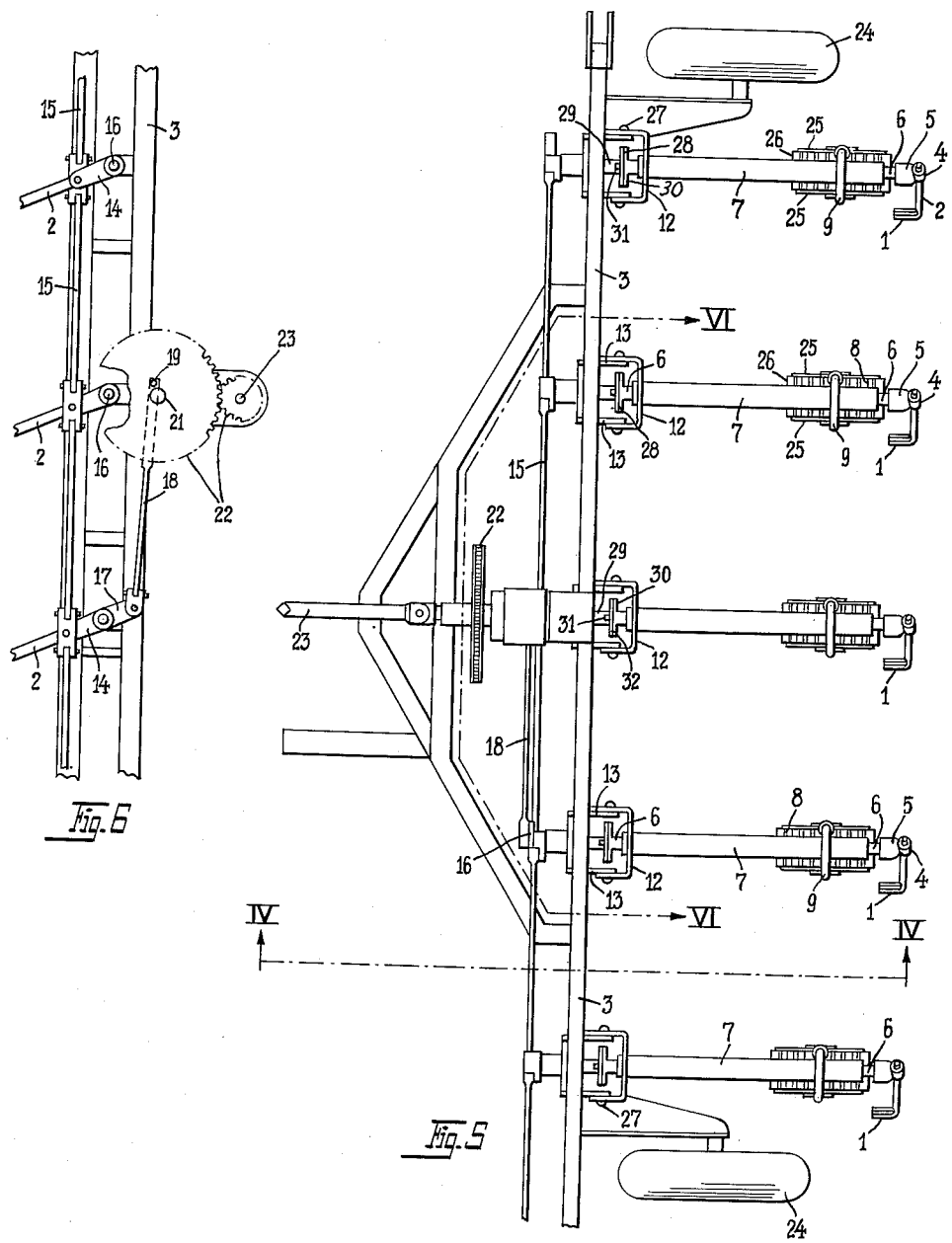
INVENTORS
John Thelander,
Gunnar Leijon,
Elving Westergren,
Sven Åkesson
by Sommers+Young
Attorneys ID 3,014,537
OSCILLATING PLANT THINNER
John Thelander, Gunnar Leijon, Elwing Westergren, and Sven Akesson, Landskrona, Sweden, assignors to Aktiebolaget Overums Bruk, Overum, Sweden, a Swedish joint-stock company
Filed June 28, 1956, Ser. No. 594,489
Claims priority, application Sweden July 2, 1955
6 Claims. (Cl. 172—58)

This invention relates to agricultural implements thinning rows of plants, such as sugar beets and other root-crops, which implements have a plurality of transversely swinging arms provided each with a tool for penetrating its own row of plants and connected at its upper end with the rear end of an oscillating driving shaft extending in the longitudinal direction of the implement.

An object of the invention is to provide a simple and effective thinning machine capable of the simultaneous working of a number of rows of plants in a depth, which will be of the same magnitude for all rows independent of the variation of the surface level along the transverse direction of the machine.

With this and other objects not specifically mentioned in view, the invention consists in certain constructions and combinations which will be hereinafter fully described reference being made to the accompanying drawings in which FIG. 1 is a rear end view of a swinging arm belonging to the implement, journalled within a supporting arm and carrying a soil penetrating tool;

FIG. 2 is a top plan view of the structure shown in FIG. 1;

FIG. 3 is a diagrammatic plan view of the undulated band of the ground surface penetrated by the tool;

FIG. 4 is a sectional view of the machine taken on the line IV—IV of FIG. 5;

FIG. 5 is a top plan view of the machine; and

FIG. 6 is a front view taken on the line VI—VI in FIG. 5, viewed from the left and showing a crank driving device of the machine.

Referring now to FIGS. 1 and 2 the tool 1 is made as a thin plate with two opposite, parallel knife edges extending in the advance direction of the machine. The tool is fixed to the lower end of a swinging arm 2, the upper end thereof being fastened to a driving shaft 6 by means of a T-formed pipe 5 with a tube portion 4, into which the arm 2 is introduced so as to be adjustably fixed by screws in a desired position. The implement which is carried by two transport wheels 24 is according to FIG. 5 provided with a plurality of tools 1 for thinning a corresponding number of rows of plants, and the tools are all supported and driven in the same manner. Each driving shaft 6 is carried by and journalled within a supporting arm 7 and each supporting arm has its fore portion mounted swingable on horizontal pins 27 in framework 3 by means of a fork-shaped yoke 12 on the arm and two ears 13 projecting from the frame. Each driving shaft 6 is within its arm 7 and opposite to the fixed pivot of the arm connected by means of a universal joint 28 formed as a resilient coupling with a fore crank shaft 29 journalled in the framework. The coupling comprises two pairs of diammetrically opposed radial pins 30 and 31 secured at the end portions of shafts 6 and 29 respectively, the axis of one pair of pins being angularly disposed to form an angle of 90° with the axis of the other pair of pins. The pins are vulcanized to an intermediate rubber disc 32 allowing the two rotary shafts 6 and 29 to form an angle to one another.

Each arm 7 rests on a supporting member, suitably made guide wheel 8 travelling on the ground, and at least when thinning smaller plants the wheel is running over the row of plants. The guide wheel 8 includes one or two circular end discs 25 and a plurality of narrow rods 26 extending from the peripheral portions of the discs so as to form a squirrel-cage. The pivot shaft 9 of the guide wheel 8 extends upwards and is by means of a vertical, downwardly extending pin portion 10 removably fastened in a holder 11 at the side of the arm 7 in such a way that the guide wheel can be placed alternatively exactly below the supporting arm or laterally displaced for travelling between two rows of plants, which may be preferred in case the plants are too big and might be injured by the wheel passing over them.

The fore end of each of the driving crank shafts 29 protruding from the framework has a downwardly directed crank arm 14 pivotally connected to a common transversely oscillating coupling bar 15, which is mounted on said shaft for transverse movement thereto. Each crank arm 14 is fixed to the corresponding driving crank shaft 29 by a hub 16, and one of these hubs has an upwardly directed arm 17 which by means of a connecting rod 18 is connected to a crank pin 19 on a shaft 21 mounted in a bearing 20. This shaft is driven by means of a transmission device 22 from a shaft 23 being in driving connection with the power take off of a tractor not shown.

When the implement operates on a field for thinning plants of root-crops and is towed by a tractor the wheels of the tractor and the wheels 24 of the implement pass between the rows of plants, while each swinging center 16 of the arms 2 is located vertically above a row A. Each oscillating tool 1 will then pass through the soil and the row of plants along a zigzag-formed or undulated path as indicated in FIG. 3 so as to remove or cut off the plants located on the penetrated surface, while single plants or groups of plants B remain uninjured. Simultaneously weeds are destroyed and the soil is loosened along the penetrated path of the tool. The effective length of the swinging arm 2 and the depth of the knife 1 in the soil can be adjusted as desired by longitudinal displacement of the arm in the holder 4, 5. The tool 1 can have also its fore end portion formed as a knife for cutting of weeds more effectively during its forward motion between the rows. As the arms 7 are supported by the travelling guide wheels 8 rolling in the respective rows A the arms 7 and 2 will move individually up and down in dependence of the varying level of the plants. To avoid injury to the plants by the travelling guide wheel 8 the cross bars 26 are thin and spaced relatively far apart, with a greater distance between adjacent narrow rods than the thickness of a rod and the external surface of each rod situated at a greater distance from the axis of the wheel than the radius of the disc or discs 25 of the wheel. Thereby the further advantage is obtained that moist soil will not fasten to the wheel, since the wheel does not run directly on the ground but turns about the rod which temporarily is resting on the ground until the next rod will reach the ground. The rod, temporarily resting on the ground, turns relative to the ground by which a rubbing action between the rod and the ground is obtained, which prevents soil from being entangled to the rod. Otherwise, if the tread of the wheel is entangled with soil, the oscillating tool 1 will be raised and the correct adjustment of the working depth of the tool lost.

Another special purpose of the wheel is to break dried soil clods into pieces thereby preventing the swinging arm and the tool from driving away big clods with plants which should remain uninjured.

If the swingable arm is driven from the power take off of a tractor different rates of oscillation can be obtained corresponding to the different gears of the gear box, while the advance speed is constant, but the tools may also be driven from the wheels 24. If desired a continuous or discontinuous gear mechanism may be provided on the framework 3, and also other modifications of the embodiment as shown may be made without departure from the invention.

What we claim is:

1. An oscillating plant thinner comprising a framework, framework supporting wheels carrying said framework, a plurality of rearwardly extending supporting arms, means swingably mounting each of said supporting arms on said framework for vertical swinging on a horizontal axis, a plurality of supporting guide members engaging the surface of the ground and each mounting and supporting the rear portion of said swingable supporting arms at positions spaced from said swingably mounting means, respectively, a plurality of downwardly extending transversely swingable tool-holding arms, each carrying at its lower end a soil penetrating tool; drive means for imparting transverse swinging movement to said downwardly extending tool-holding arms, said drive means including a transversely oscillating drive element mounted on said framework and extending transversely thereof, rearwardly extending oscillatory drive shaft elements each drivingly connected at the rear portion thereof with one of said swingable tool-holding arms, respectively, said drive shaft elements each being supported by one of said supporting arms for vertical swinging movement therewith, individual crank elements for each of said oscillatory drive-shaft elements drivingly connecting said transversely extending drive element with each of said rearwardly extending drive shaft elements, one of the said elements of said drive means being flexible to permit vertical swinging movement of said individual rearwardly extending drive shaft elements to accommodate the movements of the respective supporting arms induced by the respective ground engaging supporting guide members.

2. An oscillating plant thinner according to claim 1, and in which said ground engaging supporting guide members are each comprised of a wheel having a plurality of angularly spaced, narrow, peripheral rods which engage the ground at spaced intervals to reduce damage to the plants, and in which mountings are provided mounting said guide wheels on said swingable supporting arms.

3. An oscillatory plant thinner for thinning plants according to claim 1, and a continuously rotatable shaft drivingly connected with said transversely extending drive element.

4. An oscillating plant thinner according to claim 2, and in which the position of mounting said supporting guide wheels is lateral of the respective central planes of said wheels, said supporting guide wheels being removably fastened by said mountings and replaceable in said mountings in a different angular position to locate said wheels at different positions relative to the ground-penetrating tools and the rows of plants being thinned, one of said positions being in the rows of plants to be thinned and the other position being between the rows.

5. An oscillating plant thinner as claimed in claim 2, wherein each supporting guide wheel includes at least one circular end disc carrying said narrow rods extending from its periphery with a portion of the external surface of each rod situated at a greater distance from the axis of the wheel than the radius of the disc.

6. An oscillating plant thinner as claimed in claim 2, wherein in each supporting guide wheel the spaces between adjacent narrow rods are greater than the thickness of a rod.

References Cited in the file of this patent

UNITED STATES PATENTS

| | | |
|---|---|---|
| 762,714 | Harwell | June 14, 1904 |
| 987,435 | Crow | Mar. 21, 1911 |
| 1,113,722 | Weatherly | Oct. 13, 1914 |
| 1,348,764 | Thornhill | Aug. 3, 1920 |
| 2,569,464 | Edwards et al. | Oct. 2, 1951 |

FOREIGN PATENTS

| | | |
|---|---|---|
| 611,763 | France | Oct. 11, 1926 |
| 508,832 | Germany | Oct. 2, 1930 |